(12) United States Patent
Jo et al.

(10) Patent No.: US 10,607,823 B2
(45) Date of Patent: Mar. 31, 2020

(54) SHOT-TO-SHOT SAMPLING USING A MATRIX-ASSISTED LASER DESORPTION/IONIZATION TIME-OF-FLIGHT MASS SPECTROMETER

(71) Applicants: Eung Joon Jo, Old Tappan, NJ (US); Yohahn Jo, Old Tappan, NJ (US)

(72) Inventors: Eung Joon Jo, Old Tappan, NJ (US); Yohahn Jo, Old Tappan, NJ (US)

(73) Assignee: Highland Innovations Inc., West New York, NJ (US)

( * ) Notice: Subject to any disclaimer, the term of this patent is extended or adjusted under 35 U.S.C. 154(b) by 0 days.

(21) Appl. No.: 15/682,112

(22) Filed: Aug. 21, 2017

(65) Prior Publication Data

US 2018/0053641 A1    Feb. 22, 2018

Related U.S. Application Data

(60) Provisional application No. 62/377,768, filed on Aug. 22, 2016.

(51) Int. Cl.
*H01J 49/00* (2006.01)
*H01J 49/16* (2006.01)
*H01J 49/40* (2006.01)
*G06N 20/00* (2019.01)

(52) U.S. Cl.
CPC ...... *H01J 49/0036* (2013.01); *H01J 49/0009* (2013.01); *H01J 49/164* (2013.01); *H01J 49/40* (2013.01); *H01J 49/403* (2013.01); *G06N 20/00* (2019.01)

(58) Field of Classification Search
CPC .. H01J 49/0009; H01J 49/0036; H01J 49/164; H01J 49/40; H01J 49/403
See application file for complete search history.

(56) References Cited

U.S. PATENT DOCUMENTS

| | | | | |
|---|---|---|---|---|
| 5,808,300 | A * | 9/1998 | Caprioli | H01J 49/0004 250/281 |
| 7,022,980 | B2 * | 4/2006 | Zavitsanos | H01J 49/0036 250/281 |
| 7,091,479 | B2 * | 8/2006 | Hayek | H01J 49/0036 250/282 |
| 8,294,086 | B2 * | 10/2012 | Holle | H01J 49/0045 250/281 |
| 8,428,889 | B2 * | 4/2013 | Wright | G01J 3/28 702/32 |

(Continued)

OTHER PUBLICATIONS

Stowers, M. A., et al. "Application of matrix-assisted laser desorption/ionization to on-line aerosol time-of-flight mass spectrometry." Rapid Communications in Mass Spectrometry 14.10 (2000): 829-833. (Year: 2000).*

*Primary Examiner* — Wyatt A Stoffa
(74) *Attorney, Agent, or Firm* — Daniel H. Sherr, Esq.

(57) ABSTRACT

Embodiments relate to an apparatus, method, or computer program. A laser may be configured to irradiate a plurality of laser pulses on a target area to ionize a sample placed in the target area into at least one ionized particle. Electrodes at a first end of a flight tube may be configured to accelerate ionized particles into the flight tube. A detector at a second opposite end of the flight tube may independently measure a time of flight of the ionized particles through the flight tube and an intensity of the ionized particles.

32 Claims, 12 Drawing Sheets

(56) References Cited

U.S. PATENT DOCUMENTS

| | | | |
|---|---|---|---|
| 8,604,421 B2* | 12/2013 | Skilling | G06K 9/0057 250/282 |
| 9,099,287 B2* | 8/2015 | Giannakopulos | H01J 49/0031 |
| 2002/0175278 A1* | 11/2002 | Whitehouse | H01J 49/0095 250/281 |
| 2002/0175292 A1 | 11/2002 | Whitehouse et al. | |
| 2004/0119012 A1* | 6/2004 | Vestal | H01J 49/025 250/287 |
| 2004/0217274 A1* | 11/2004 | Bai | H01J 49/164 250/282 |
| 2004/0245452 A1* | 12/2004 | Bateman | G01N 27/622 250/287 |
| 2005/0042668 A1 | 2/2005 | Perlin | |
| 2005/0247871 A1* | 11/2005 | Bryden | H01J 49/107 250/288 |
| 2009/0039282 A1* | 2/2009 | Haase | H01J 49/164 250/423 R |
| 2009/0055100 A1* | 2/2009 | Cahill | C12N 9/0008 702/19 |
| 2009/0101813 A1* | 4/2009 | Holle | H01J 49/0045 250/287 |
| 2011/0272573 A1* | 11/2011 | Kostrzewa | H01J 49/0027 250/282 |
| 2013/0056628 A1* | 3/2013 | Holle | H01J 49/0004 250/282 |
| 2014/0117226 A1* | 5/2014 | Giannakopulos | H01J 49/0031 250/283 |
| 2015/0221488 A1 | 8/2015 | Hyeon et al. | |
| 2015/0279648 A1 | 10/2015 | Furtaw et al. | |
| 2015/0346186 A1 | 12/2015 | Jo | |
| 2015/0364312 A1* | 12/2015 | Walker | H01J 49/0027 250/282 |
| 2016/0064202 A1* | 3/2016 | VanGordon | H01J 49/0418 250/282 |
| 2016/0189943 A1* | 6/2016 | Bloomfield | H01J 49/025 |
| 2017/0084444 A1* | 3/2017 | VanGordon | H01J 49/0418 |
| 2019/0103258 A1* | 4/2019 | Richardson | H01J 49/0036 |

* cited by examiner

SHOT-TO-SHOT SAMPLING USING A MATRIX-ASSISTED LASER DESORPTION/IONIZATION TIME-OF-FLIGHT MASS SPECTROMETER

The present application claims priority to U.S. Provisional Patent Application No. 62/377,768 filed on Aug. 22, 2016, which is hereby incorporated by reference in its entirety.

BACKGROUND

Data reproducibility in a measuring process of a Matrix-Assisted Laser Desorption/Ionization Time-Of-Flight Mass Spectrometer (MALDI-TOF MS) is an important concern in the design of a system for particular applications. Since MALDI-TOF uses a solidified sample and matrix mixture on a plate onto which a laser is irradiated, it is inevitable to have a non-uniform concentration or amount of sample mixture for each area of irradiation. The changes in the concentration or amount of a sample as well as in structural formation of comprised molecules of a sample at each laser irradiation may negatively influence the reproducibility. Measuring processes employ a summation or averaging process for the intensities acquired by laser shots, which yields the summed or averaged intensities (e.g. from 500 to 1000 laser shots); unfortunately such a measuring process may have too high irreproducibility to be effective in certain applications (e.g. disease diagnosis).

SUMMARY

Embodiments relate to an apparatus, method, or computer program. A laser may be configured to irradiate a plurality of laser pulses on a target area to ionize a sample placed in the target area into at least one ionized particle. Electrodes at a first end of a flight tube may be configured to accelerate ionized particles into the flight tube. A detector at a second opposite end of the flight tube may independently measure a time of flight of the ionized particles through the flight tube and an intensity of the ionized particles.

In embodiments, independently measuring includes measuring a distribution of the time of flight and intensity of the at least one ionized particle. In embodiments, independently measuring includes independently measuring the time of flight and the intensity of the ionized particles for each pulse of the plurality of laser pulses. Independently measuring may compensate for physical variations in the sample, in accordance with embodiments. Independently measuring may optimize data reproducibility, in accordance with embodiments. Independently measuring may include independently measuring the time of flight and the intensity of the ionized particles for each locus of the sample.

In embodiments, a detector may output data which represents independent measurements. The data output may be compared to a reference library of mass spectrometer reference data (e.g. for disease diagnosis). The data output may be manipulated and/or analyzed prior to being compared to the reference library, in accordance with embodiments. In embodiments, manipulating and/or analyzing independent measurements includes implementation of artificial intelligence and/or a deep learning algorithm.

DRAWINGS

Example FIG. 1 illustrates a disease diagnosis laboratory, in accordance with embodiments.

Example FIG. 2 is a schematic view of a MALDI-TOF MS system, in accordance with embodiments.

Example FIG. 3 is a system diagram of the integrated system including a sample processing unit, a MALDI-TOF MS unit, and a diagnosis unit in one system, in accordance with embodiments.

Example FIG. 4 is a system diagram of an integrated diagnostic system including a sample processing unit and a MALDI-TOF MS unit integrated in one system, whereas a diagnosis unit is provided as a separate unit, in accordance with embodiments.

Example FIG. 5 illustrates a MALDI Plate where a spot on a sample plate is irradiated by a laser pulse, in accordance with embodiments.

Example FIG. 6 is a MALDI-TOF MS hardware diagram, in accordance with embodiments.

Example FIG. 7 illustrates a laser pulse applied to sample in MALDI chamber, in accordance with embodiments.

Example FIG. 8 illustrates an ionization of sample particles as a result of laser exposure, in accordance with embodiments.

DESCRIPTION

In mass spectrometry, matrix-assisted laser desorption/ionization (MALDI) is an ionization technique that uses a laser energy absorbing matrix to create ions from large molecules with minimal fragmentation. It has been applied to the analysis of biomolecules (biopolymers such as DNA, proteins, peptides and sugars) and large organic molecules (such as polymers, dendrimers and other macromolecules).

MALDI methodology may be a multi step process, in accordance with embodiments. First, a sample may be mixed with a suitable matrix material and applied to a metal plate. Second, a pulsed laser may irradiate the sample, triggering ionization and desorption of the sample and matrix material. The sample molecules may be ionized by being protonated or deprotonated in the hot plume of ablated gases, and can then be accelerated into a mass spectrometer (e.g. MALDI-TOF MS).

Embodiments relate to an apparatus, method, or computer program. A laser may be configured to irradiate a plurality of laser pulses on a target area to ionize a sample placed in the target area into at least one ionized particle. Electrodes at a first end of a flight tube may be configured to accelerate ionized particles into the flight tube. A detector at a second opposite end of the flight tube may independently measure a time of flight of the ionized particles through the flight tube and an intensity of the ionized particles.

In embodiments, the sample comprises biological molecules. Characteristic information of the source may include a biological analysis information of the source. The biological analysis information may be a medical diagnosis of either a human being, an animal, a plant, and/or a living organism.

Figure 1:
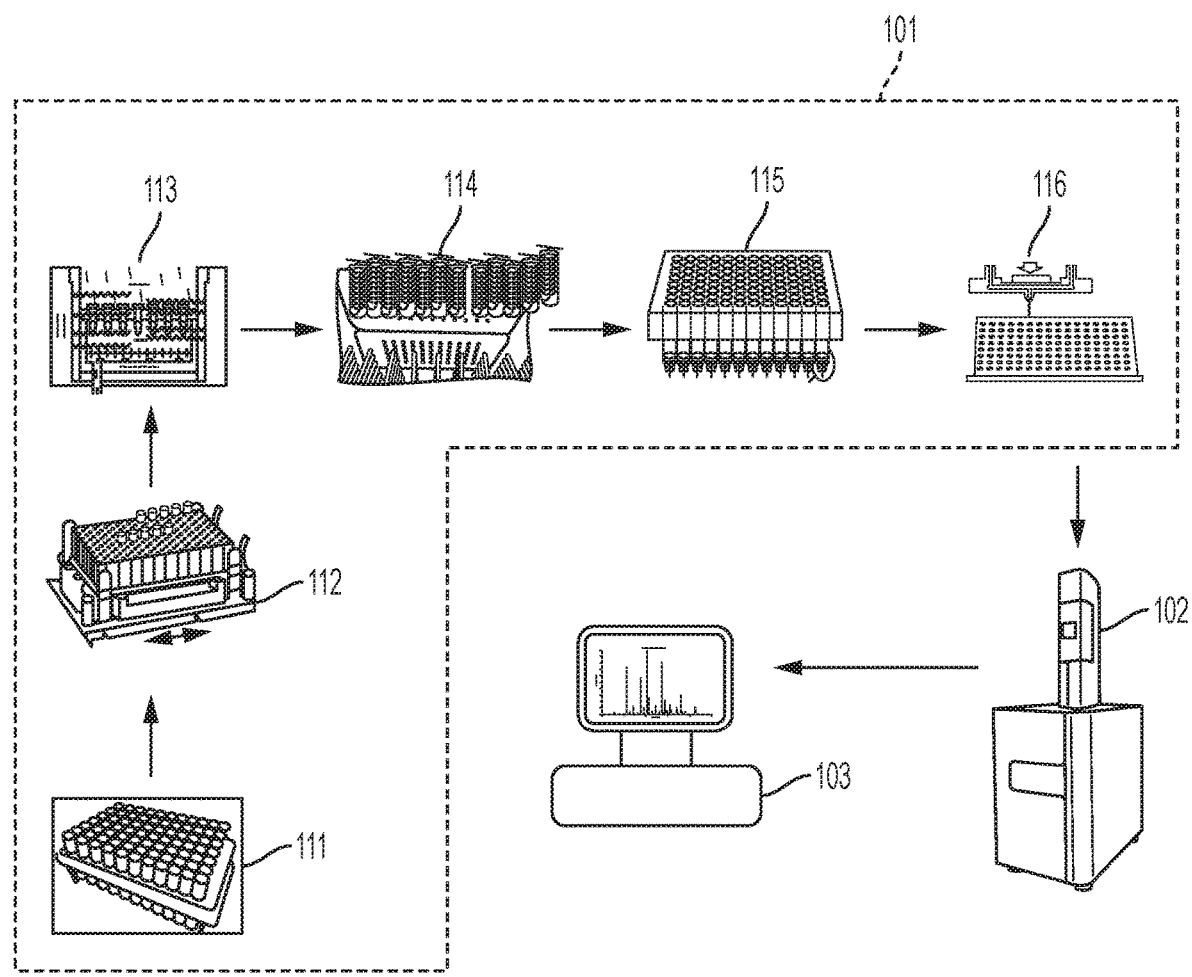
Figure 2:
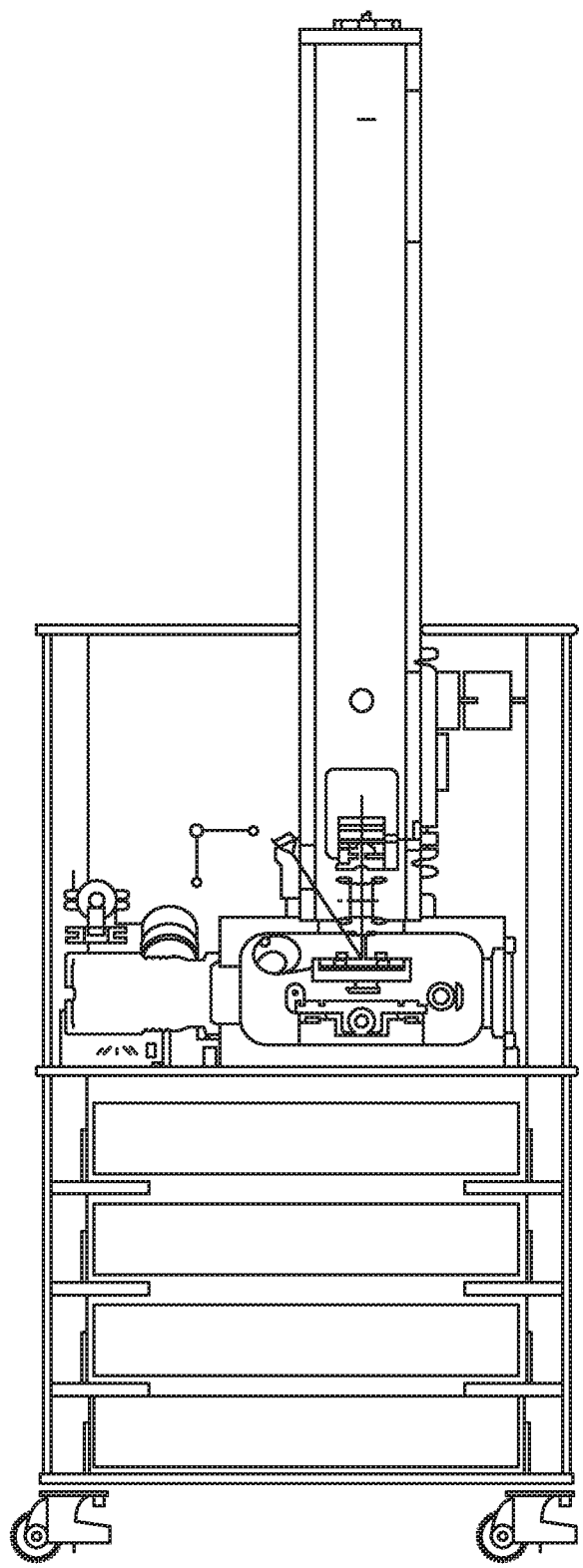

Example FIG. 1 illustrates a disease diagnosis laboratory where a sample processing facility 101 includes multiple sample processing tools, a MALDI-TOF MS system 102, and a diagnosis software system 103, which are separated from each other, in accordance with embodiments. To extract a glycan for an ovarian cancer diagnosis, for example, a patient's serum is entered into a multi-well plate 111 to undergo a sample reception process and a protein denaturation process 112, followed by a deglycosylation process using enzyme 113. A protein removal process 114, a drying and centrifugation process, a glycan extraction process 115, and a spotting process 116 then follow. The spotted samples are analyzed by the MALDI-TOF MS system 102 to generate at least one glycan profile. The diagnosis software 103 compares the glycan profile of the sample with the pre-stored glycan profile or profiles to identity the presence and progress of ovarian cancer. Example FIG. 2 is a schematic view of a MALDI-TOF MS system, in accordance with embodiments.

Figure 3:
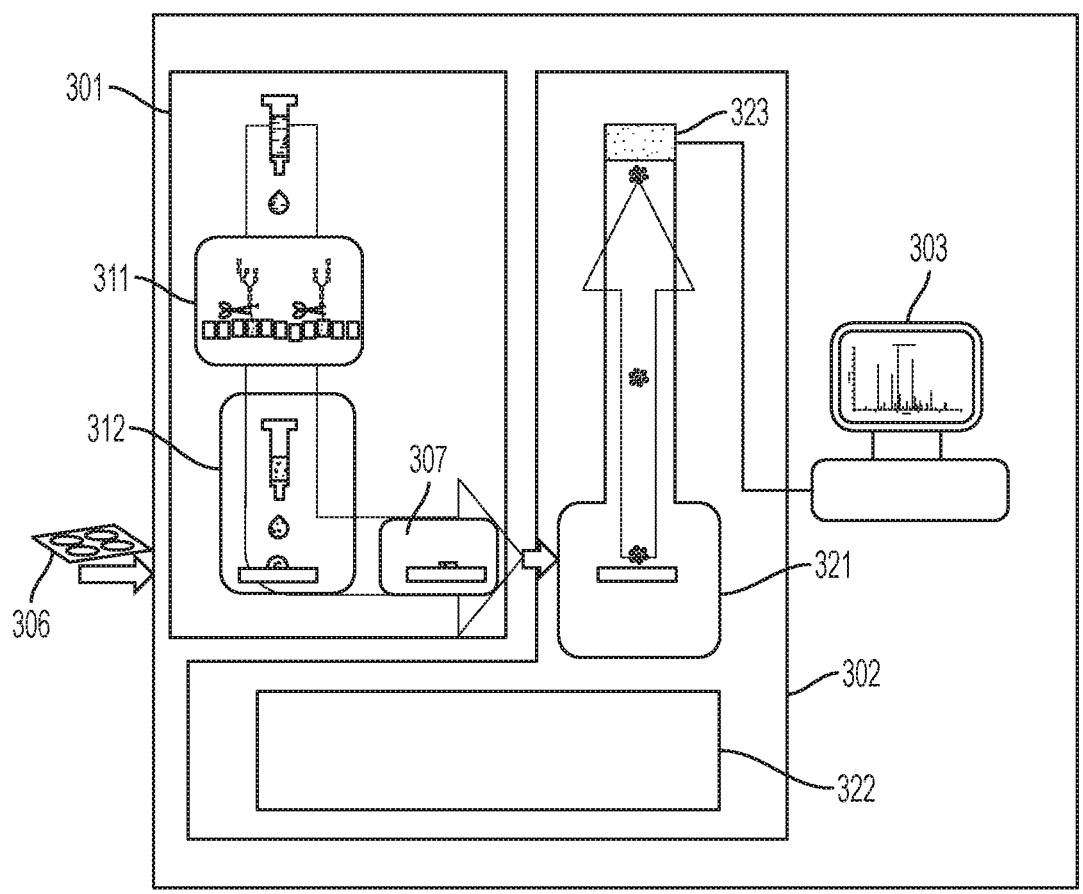

Example FIG. 3 is a system diagram of the integrated system including a sample processing unit, a MALDI-TOF MS unit, and a diagnosis unit in one system, in accordance with embodiments. Samples may undergo a combination of process by selected modules. In the sample preparation system 301, a sample goes through a predefined and pre-programmed sequence depending on diagnosis or screening purposes in an automatic sample preparation unit 311. In embodiments, for glycan extraction, multiple processing modules may be selected, which as sample reception, protein denaturation, deglycosylation, protein removal, drying, centrifugation, solid phase extraction, and/or spotting. After sample preparation, the sample loader 312 loads the samples onto the plates 306 and are dried in a sample dryer 307.

The samples may then be provided to the MALDI-TOF MS unit 302 having a ion flight chamber 321 and/or a high voltage vacuum generator 322, in accordance with embodiments. A processing unit 323 in the MALDI-TOF MS may identify the mass/charge (m/z) and its corresponding intensity. For the disease diagnostic purpose, those acquired mass and intensity data may be reorganized to set up a standard mass list, in which a concept of the center of mass where intensities are balanced and equilibrated is introduced. A standard mass to charge list is defined based upon the machine accuracy and the center of mass concept. The stored spectrum data for each laser irradiation may also be used to set up the standard mass list. The diagnostic unit 303 may then compare, the spectra from a patient's sample with the pre-stored spectra and analyzes the pattern difference of the two spectra. The diagnostic unit may then identify the presence and progress of the disease.

Figure 4:
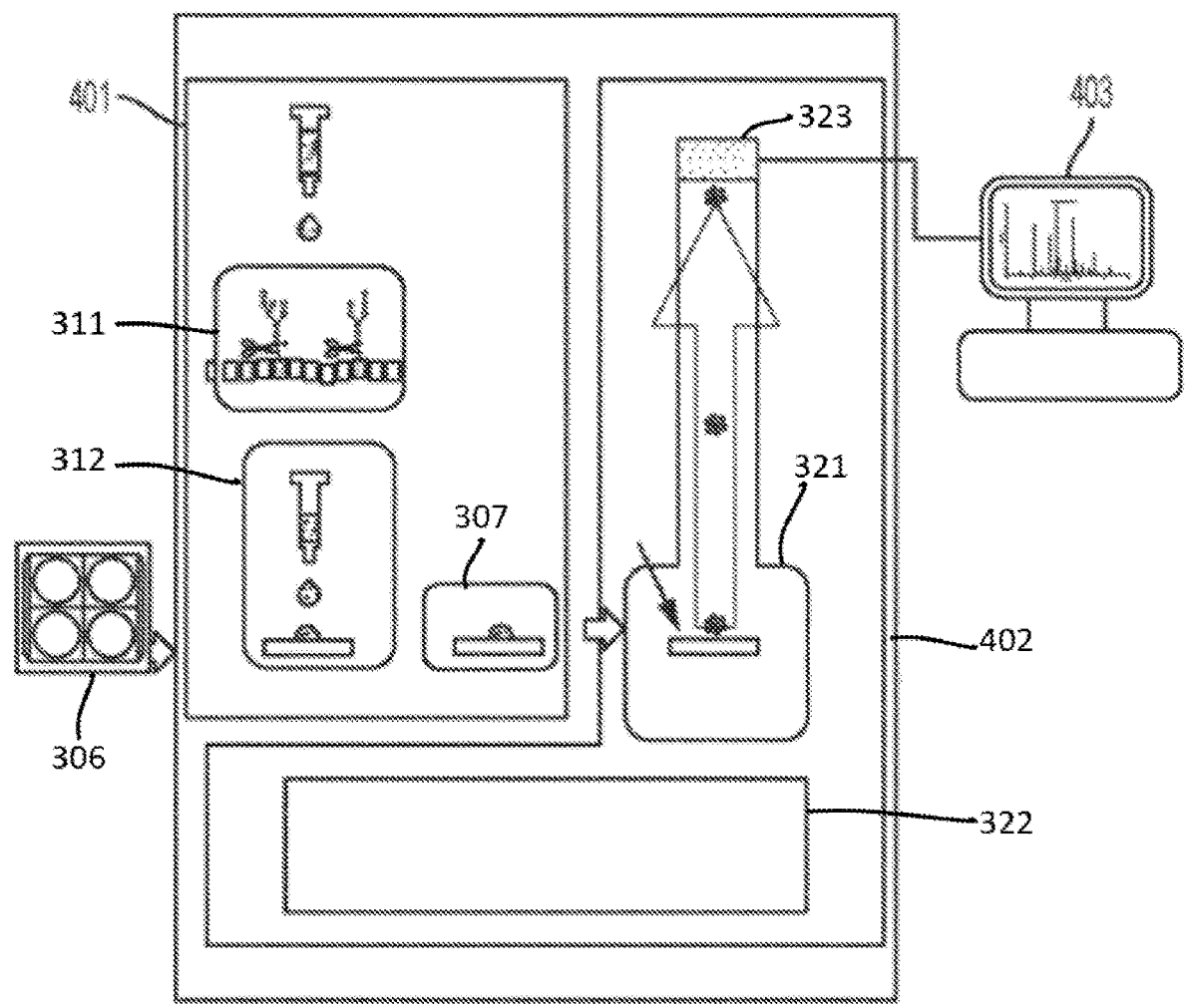

Example FIG. 4 is a system diagram of an integrated diagnostic system including a sample processing unit and a MALDI-TOF MS unit integrated in one system, whereas a diagnosis unit is provided as a separate unit, in accordance with embodiments. Example FIG. 4 illustrates an integrated disease diagnosis system where the sample preparation unit 401 and the MALDI-TOF 402 are integrated, with the diagnosis unit 403 stands apart as a separate unit, in accordance with embodiments.

In embodiments, a detector outputs data which represents the independent measurements. The data output from the detector may be compared to a reference library of mass spectrometer reference data. The sample reference library may be stored on a storage device, a Matrix-Assisted Laser Desorption/Ionization Time-of-Flight Mass Spectrometer (MALDI-TOF MS), a data storage device in the apparatus, a data storage device outside the apparatus, a data storage device in communication with the apparatus through a network, a cloud storage system, a data storage device in communication with the apparatus through an internet connection, and/or any other storage device or equivalent appreciated by those skilled in the art.

In embodiments, data output from a detector is at least one of manipulated and/or analyzed prior to being compared to the reference library. Manipulated and/or analysis may include implementation of artificial intelligence and/or a deep learning algorithm. In embodiments, manipulated and/or analyzed data may include calibrated data produced by statistically analyzing the data output from a detector.

A calibration unit may be configured to statistically calibrate the data output from the detector to maximize the reproducibility of the data, in accordance with embodiments. In embodiments, the calibrating unit may be configured to calibrate intensities of the data output from the detector by eliminating outliers of the intensity data for each mass-to-charge (m/z) peak associated with ionized particles. The calibrating unit may be configured to select data sets including the data output from the detector which shows a relative standard deviation (RSD) satisfying a triggering threshold. In embodiments, the triggering threshold may be a predetermined threshold, a dynamic threshold, a statistically determined threshold, a real-time varying threshold, a threshold determined by artificial intelligence, and or a threshold determined by a deep learning algorithm.

In embodiments, the calibrating unit may be configured to select data sets from the data output from the detector utilizing continuous data distribution analysis after the plurality of laser pulses. In embodiments, selecting the data sets may use an algorithm by which a percentage of the data is eliminated. The algorithm may be performed before combining a plurality of data sets of the at least one data set, in accordance with embodiments. In embodiments, the combining may include averaging and/or summing of the intensities of a plurality of data sets. In embodiments, a percentage of selected data sets may be determined by at least one predefined rule to minimize a relative standard deviation (RSD) of intensities of the data.

In embodiments, it may be determined from a single laser pulse of a plurality of laser pulses an authentic mass of the at least one ionized particle and/or center of mass of the at least one ionized particle with optimal accuracy and/or reproducibility.

Figure 5:
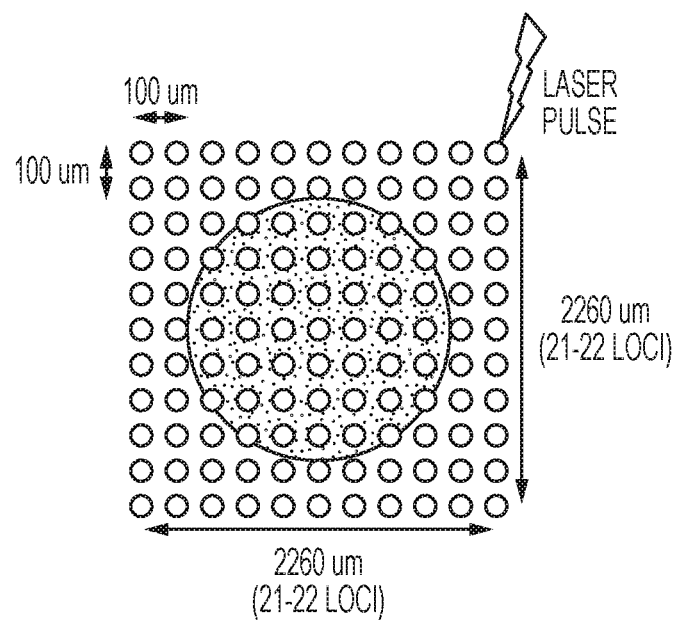

Example FIG. 5 illustrates a MALDI plate where a spot on a sample plate is irradiated by a laser pulse, in accordance with embodiments. Each time a laser pulse is fired on a spot, a spectrum of peaks may be created (e.g., as shown in example FIGS. 9-12). Due to non-homogeneous nature of drying sample and matrix mixture on a sample plate, intensities may vary depending on a spot hit by a laser beam. Measured mass values and corresponding intensities may fluctuate with shots.

Figure 6:
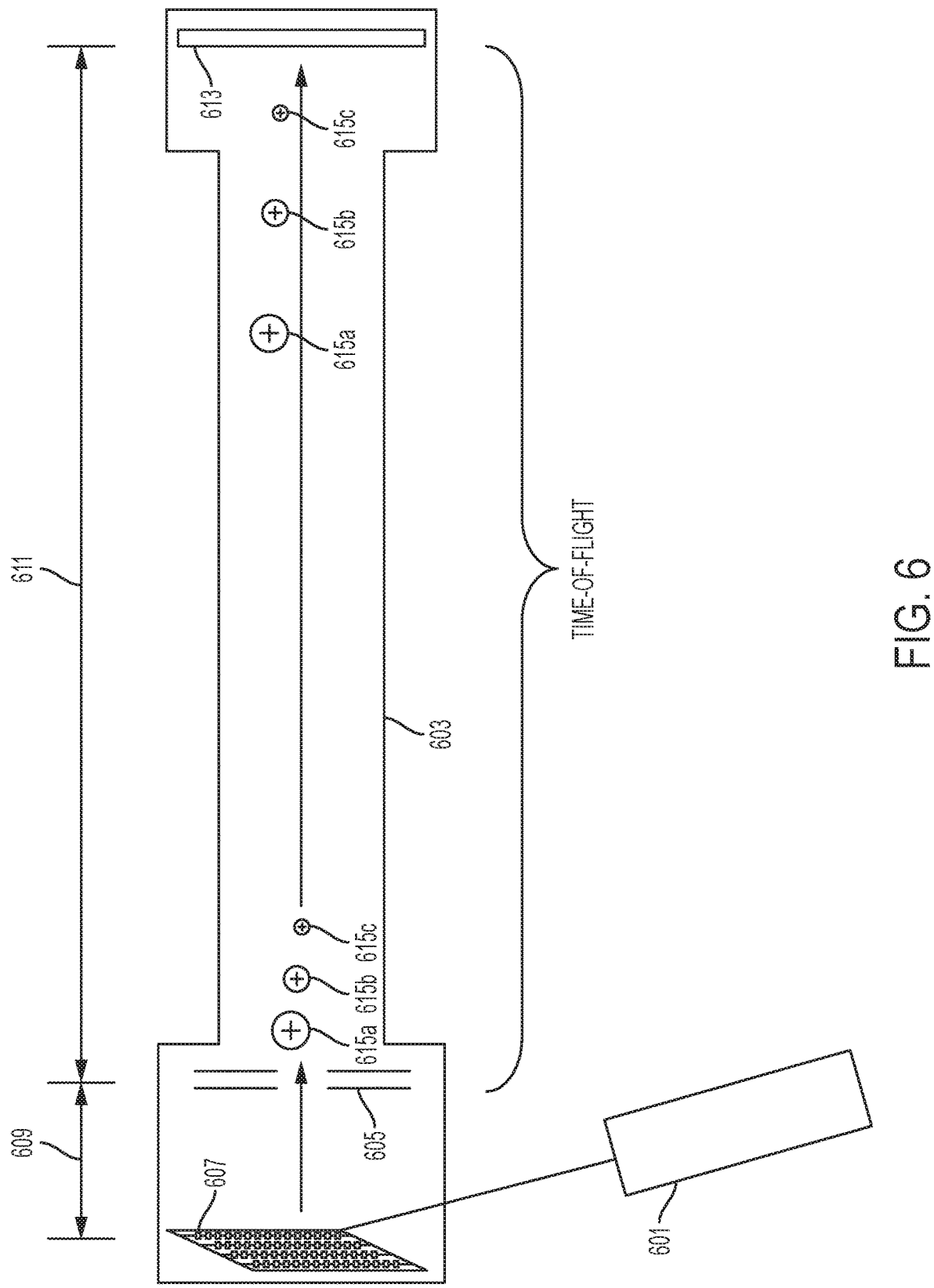

Example FIG. 6 is a MALDI-TOF MS hardware diagram, in accordance with embodiments. Different types of detectors 613 are available, as appreciated by those of ordinary skill in the art. A MALDI-TOF MS system may exploit the fact that all ions 615a-c accelerated in the same electric field 605 may have the same or substantially the same kinetic energy. After leaving the electric field 605 (e.g. generated by electrodes) ions 615a-c may enter a field-free section and/or flight tube 603. Flight tube 603 may have a predetermined length 611. Ions 615a-c have different speeds depending on their mass. Large ions 615a may take more time to traverse the flight tube than smaller ions 615c.

The matrix 607 containing a sample may be irradiated by a laser 601. Both the sample molecules on the matrix 607 may be vaporized. As the matrix 607 absorbs the laser 601 and the sample becomes ionized, some of that energy is passed to the sample molecules and a number of the sample molecules become ionized 615a-c. Voltage may be applied to electrodes in a chamber containing the matrix 607, drawing the ionized molecules 615a-c to the mass spectrometer tube 603 and ultimately to detector 613.

An electrostatic field along the tube 603 of the spectrometer causes the ionized molecules 615a-e to fly down the length of the tube 603. The "time of flight" (TOF) is the time it takes the ions 615a-c to reach the detector 613 at the end of the tube 603 and depends on its mass/charge ratio (m/z) of the ionized particles 615a-c. The recorded time is converted by the spectrometer and is reported as an m/z ratio, where m is the mass of the ion in Daltons, and z is the ions' charge.

Figure 7:
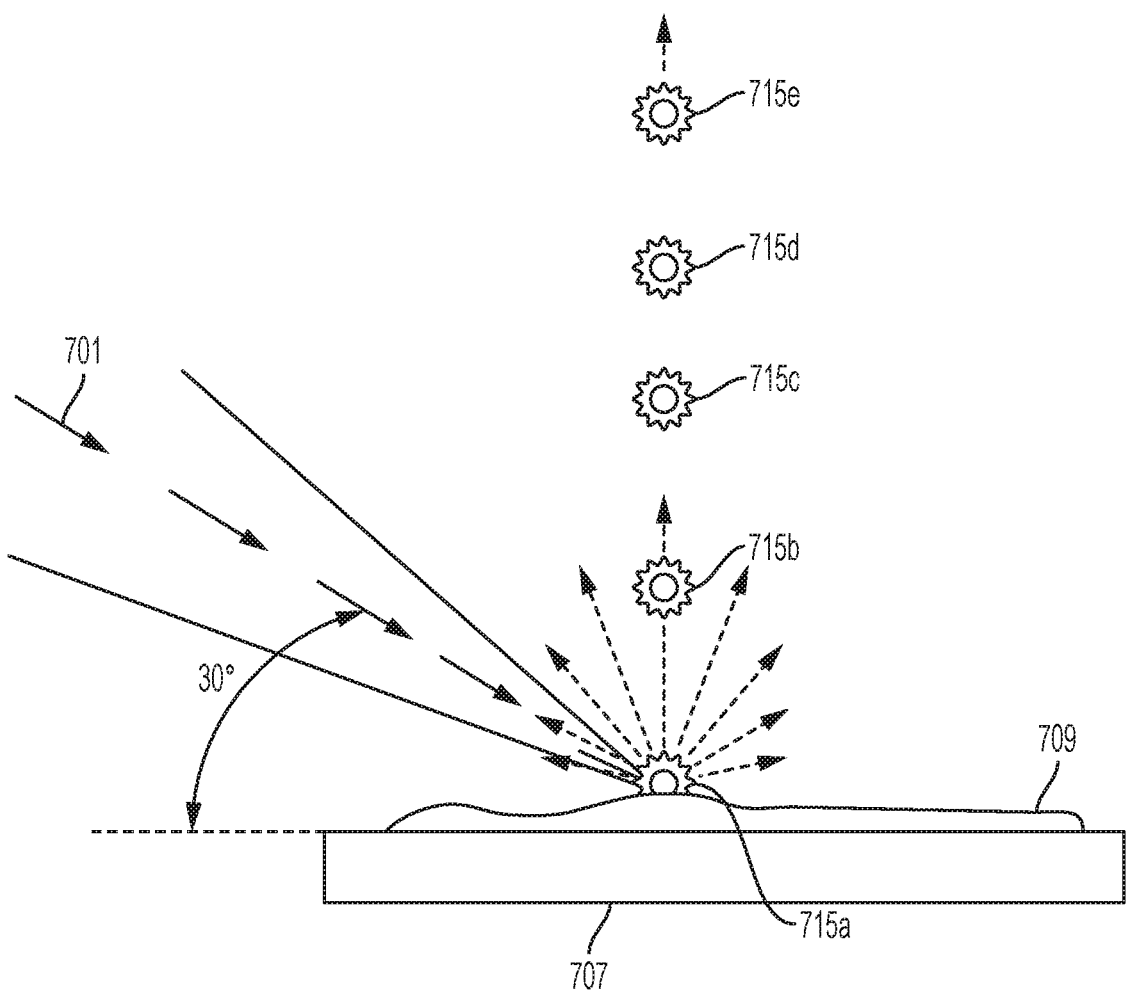

Example FIG. 7 illustrates a laser pulse applied to sample in MALDI chamber, in accordance with embodiments. The sample 709 on substrate 707 is irradiated by laser beam 701. In embodiments, laser beam 701 is UV light. In embodiments, laser beam 701 is projected onto the sample 709 at approximately a 30 degree angle, although all other angles may be used. In embodiments, ionized particles 715a-e are produced as a result of the laser beam 701 and drawn away from the sample.

Figure 8:
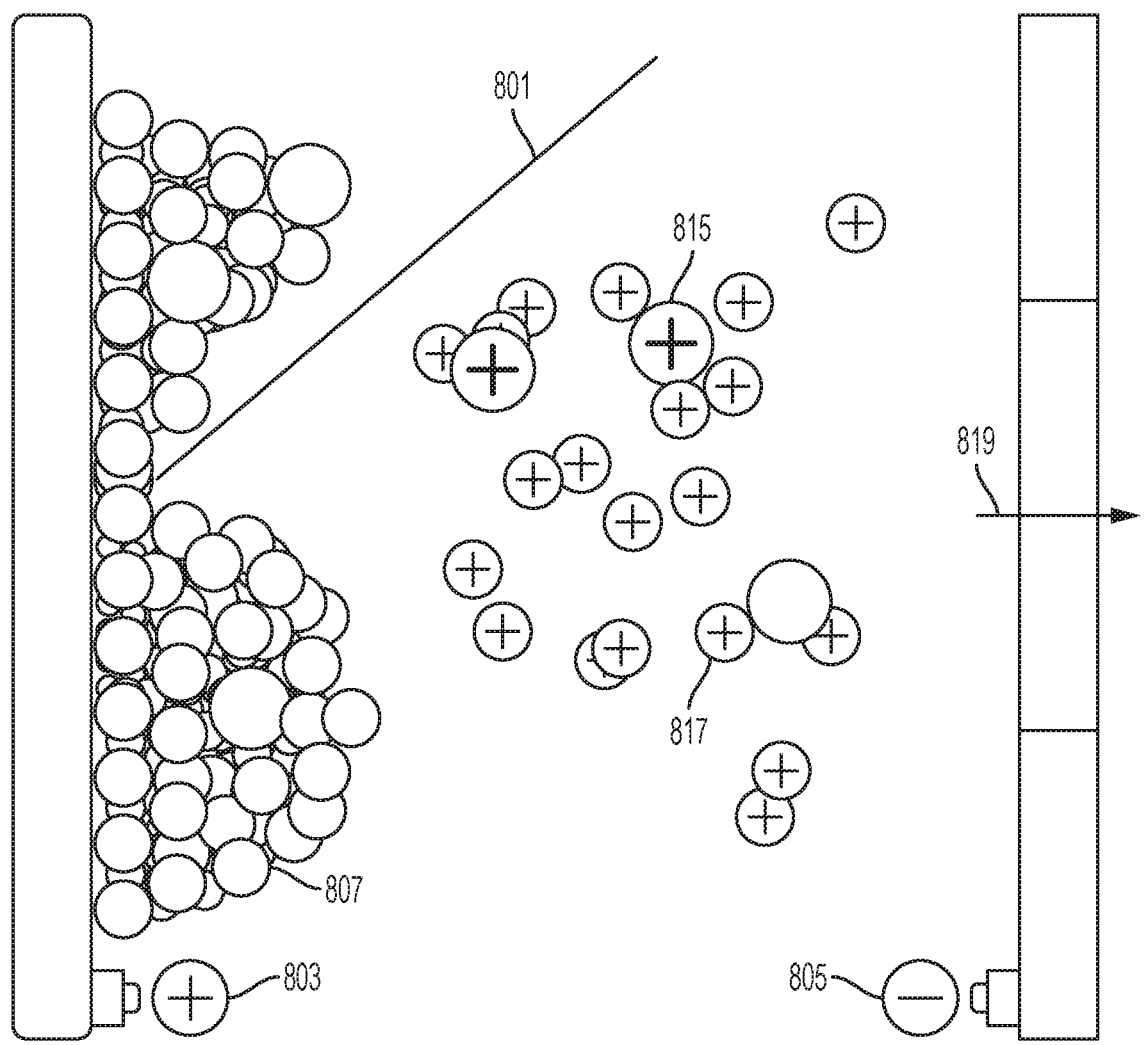

Example FIG. 8 illustrates an ionization of matrix and sample particles 807 as a result of laser beam 801, in accordance with embodiments. The sample 807 may be irradiated by laser beam 801. The sample molecules 807 are vaporized into ionized particles (e.g. ionized particles 815 or 817). As the sample 807 absorbs the laser beam 801 and portions of sample 807 become ionized, some of that energy is passed to the ionized particles 815 or 817. Voltage is applied to electrodes 803 and 805, drawing 819 the ionized molecules 815 or 817 to the mass spectrometer tube (e.g. tube 603 of FIG. 6).

Figure 9:
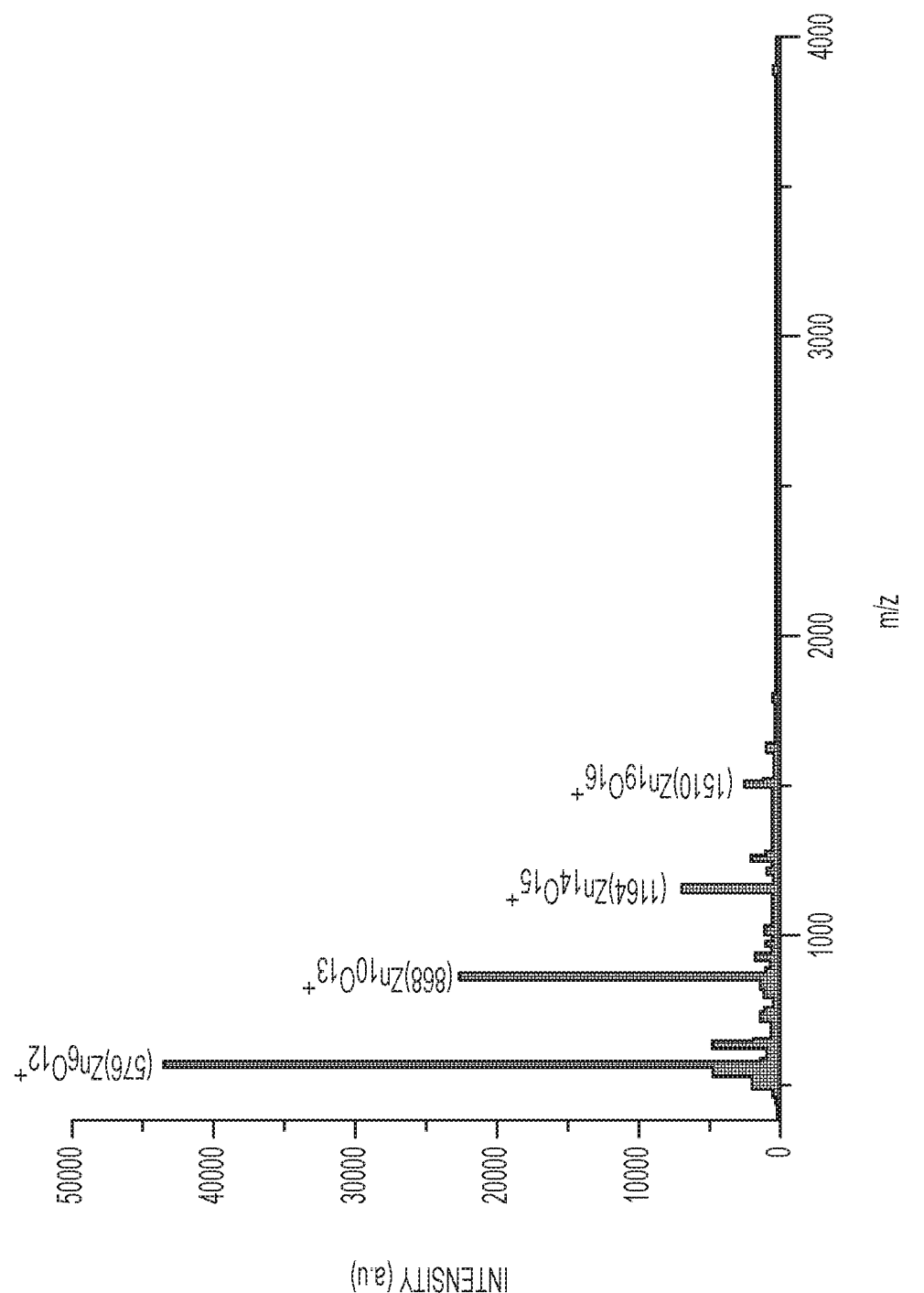
FIG. 9 is an example MALDI TOF mass spectra of ZnO, in accordance with embodiments.

Example FIG. 9 illustrates a MALDI TOF mass spectra of ZnO. A series of peaks were observed in the m/z range of 500 to 2000. Major peaks were observed at 576 m/z corresponding to $Zn_6O_{12}^+$ and at 868 m/z corresponding to $Zn_{10}O_{13}^+$. Clusters of $Zn_{14}O_{15}^+$ and $Zn_{19}O_{17}^+$ were also observed as minor peaks. The data output from a detector may be represented as a spectrum (e.g. as shown in example FIGS. 9-12), which may be a list of peaks that represent a list of particular molecules combined in the original sample.

Figure 10:
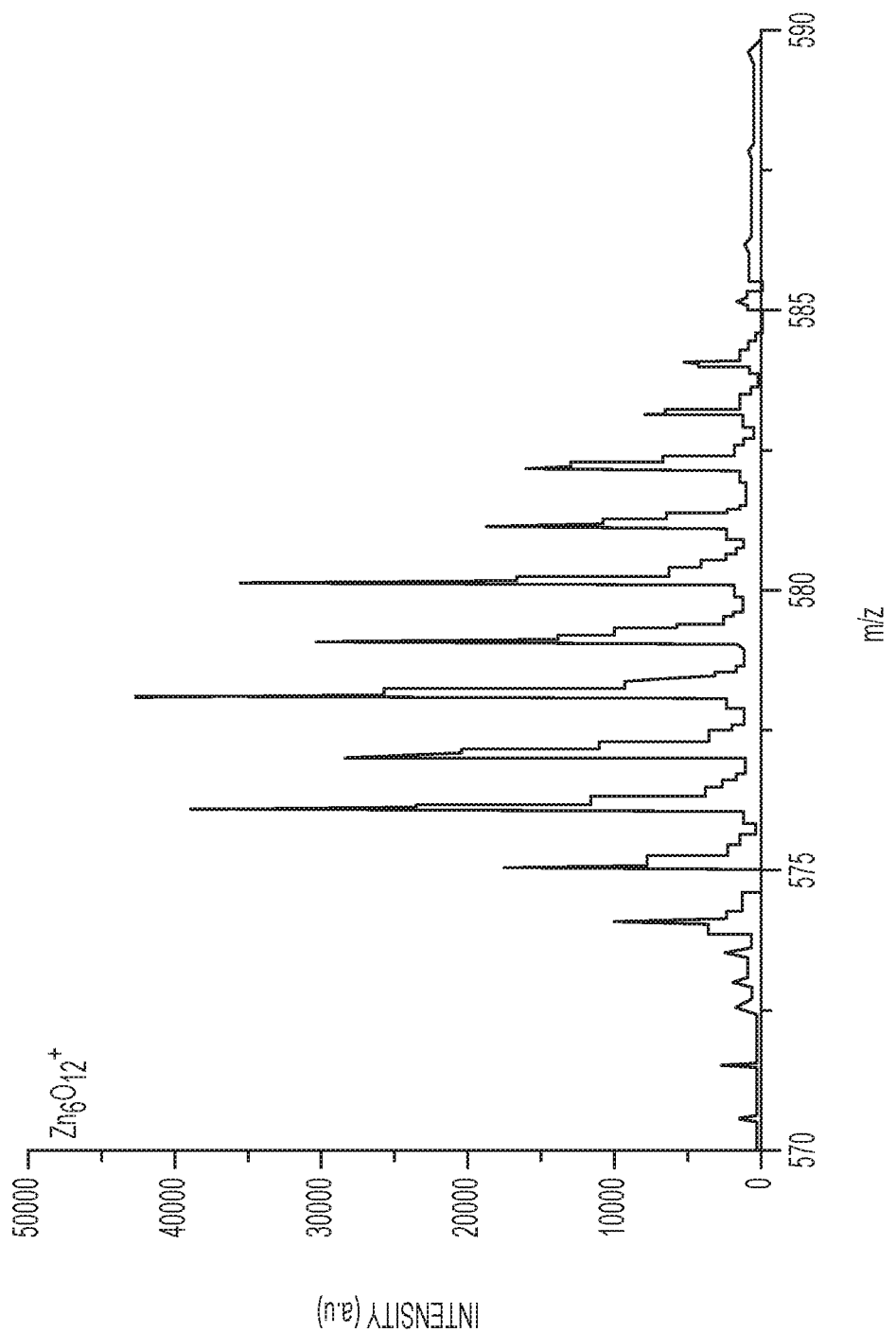
FIG. 10 illustrates enlarged example mass spectra of FIG. 9 around 576 m/z, in accordance with embodiments.

Example FIG. 10 illustrates enlarged mass spectra of FIG. 9 around 576 m/z, in accordance with embodiments. It can be seen that the peak at 576 m/z actually consists of multiple small peaks separated from each other. These multiple small peaks may have different m/z peaks due to attributes of the ionized particles. In embodiments, a detector independently measures to isolate variations in attributes of each of the ionized particles, which may be represented by the multiple peaks in FIG. 11. In embodiments, the attributes of the ionized particles may include an acceleration efficiency of each of the ionized particles through electrodes. In embodiments, the attributes of each of the ionized particles may include delays in the ionized particles entering the flight tube. In embodiments, the attributes of the ionized particles may include variations of path of flight of the ionized particles inside the flight tube.

Figure 11:
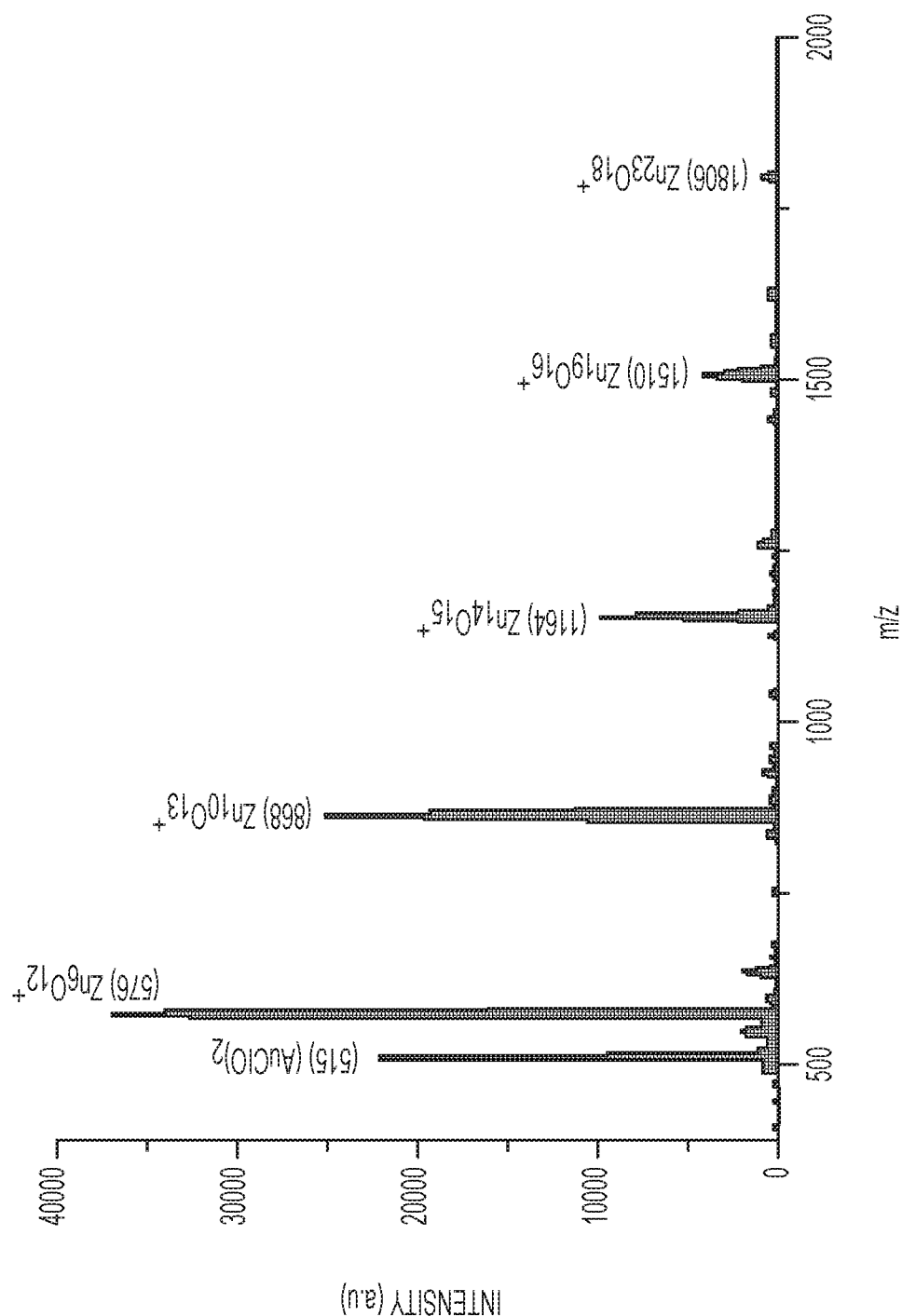
FIG. 11 is an example MALDI-TOF mass spectra, in accordance with embodiments.

Example FIG. 11 illustrates an example MALDI-TOF mass spectra of a sample including both Zn and Au, in accordance with embodiments. Accordingly, important information can be lost (e.g. Au is not detected) since the Au peaks may be indistinguishable from the Zn peaks. For example, in medical diagnosis applications, an opportunity to diagnose a disease may be lost due to spread peaks of two different types of molecules that are close to each other. Such challenges may be overcome, in embodiments, by independently measuring the sample.

In embodiments, independently measuring may include measuring a distribution of the time of flight and intensity of the ionized particles. In embodiments, independently measuring is effectively a noise filter from noise produced in the target area upon being irradiated by a plurality of laser pulses. In embodiments, the noise filter minimizes data truncation of data measured by the detector. In embodiments, the noise filter minimizes undesirable intensity effects of data measured by the detector. In embodiments, the independently measuring may include independently measuring the time of flight and the intensity of the ionized particles for each pulse of the plurality of laser pulses. In embodiments, the detector may independently measure to compensate for physical variations in the sample. In embodiments, the detector may independently measure to optimize data reproducibility. In embodiments, the detector independently measures to maximize diagnostic accuracy. In embodiments, the independently measuring may include independently measuring the time of flight and the intensity of the ionized particles for each locus of the sample. In embodiments, the independently measuring may include independently measuring the time of flight and the intensity of the particles for each well of target area.

Figure 12:
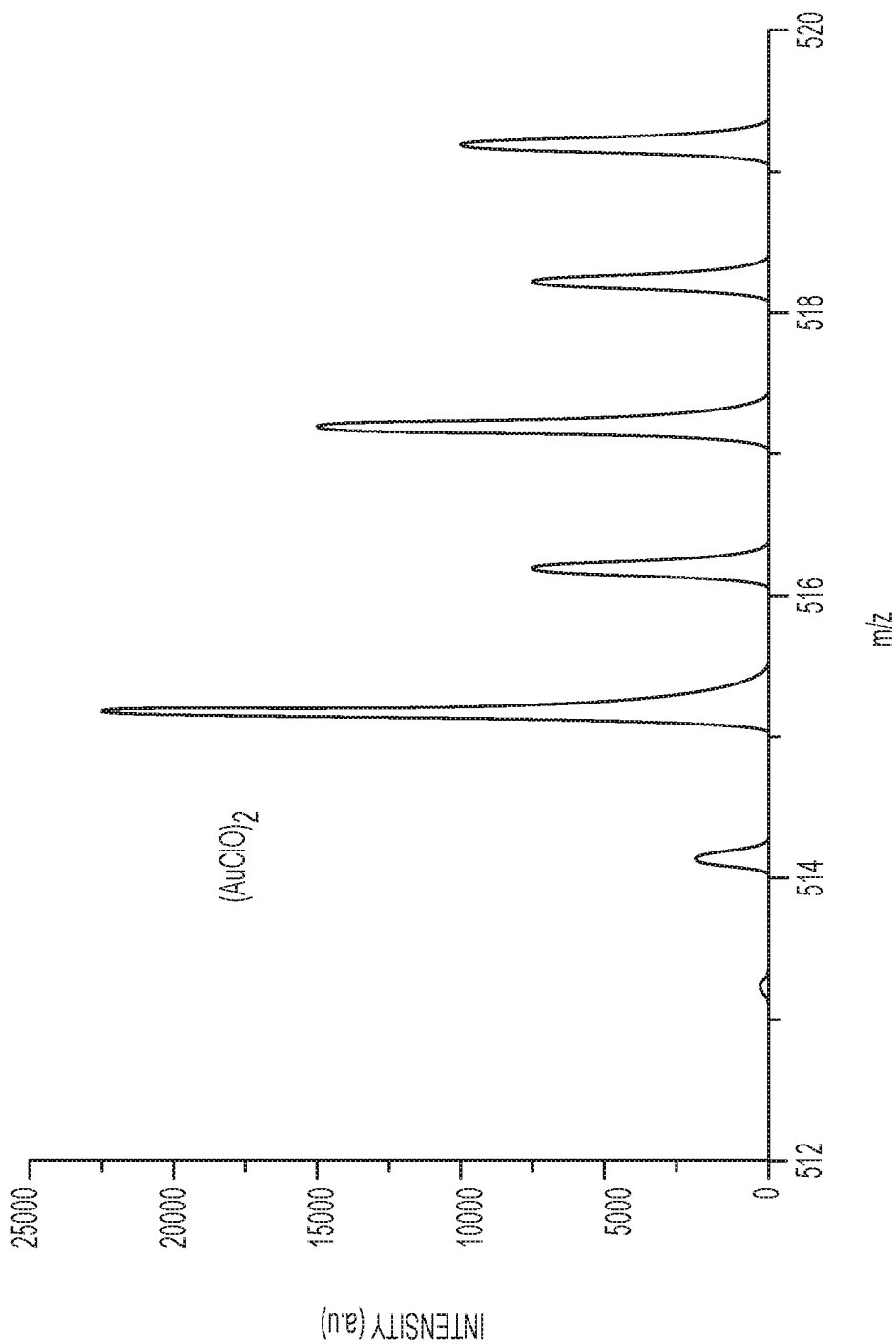
FIG. 12 illustrates example peaks around 515 m/z corresponding to AuCl particles close to independent peaks corresponding to Zn particles of FIG. 11, in accordance with embodiments.

Example FIG. 12 illustrates the peak at 515 m/z corresponds to the $(AuClO)_2$ cluster of FIG. 11, in accordance with embodiments. The peaks are made up of small peaks separated by one unit. Since Cl exists in two stable isotopic forms, $^{35}Cl$ and $^{37}Cl$, this indicates the isotropic distribution of the original sample. Although the AuCl peaks are less pronounced than the Zn peaks, these smaller peaks of AuCl contain valuable information, in accordance with embodiments.

Embodiments relate to use of laser shot-to-shot data independently, instead of just summing up or averaging them. Embodiments may use the distribution of each shot data for mass and intensity so that all the data are statistically and analytically weighted, which may increase the reproducibility of data.

Embodiments relate to data manipulation to compensate for variations in sample distributions. Even with an integrated sample preparation system (e.g. to minimize the human and environmental errors), there may be inconsistencies when adding up all the data from well to well (e.g. locus-to-locus) in a spot of the test plate. The added intensities may vary with spot-to-spot due to the initial thickness of the sample loads and structure of the points when a laser irradiates. For example, each well or locus may have sample material (to be tested) that is irregularly spread across its surface among a plurality of wells or multiple locus divisions. Embodiments compensate for this inconsistency by treating each locus or well separately and apply the corresponding data manipulation techniques to each locus or well. Embodiments relate to shot-to-shot locus separation that may yield an effective filter for noise from plate or MALDI equipment or matrix, which may result in minimal data truncation and/or intensity effect of masses in the data. Embodiments may optimize data reproducibility and/or diagnostic accuracy.

In embodiments, a laser may be fired at the matrix crystals in the dried-droplet spot. The matrix absorbs the laser energy and it is desorbed and ionized. A hot plume produced during ablation may contain different species (e.g. neutral and ionized matrix molecules, protonated and deprotonated matrix molecules, matrix clusters, and/or nanodroplets). Ablated species may participate in the ionization of analyte.

MALDI/TOF spectra may be used for the identification of micro-organisms such as bacteria or fungi, in accordance with embodiments. A sample may be placed onto a target area and overlaid with matrix. The mass spectra generated may be analyzed by dedicated software and compared with stored profiles. Species diagnosis by this procedure may be quicker, more accurate, and/or cheaper depending on the application.

A biomarker is a biological molecule found in blood, other body fluids, or tissues that is a sign of a normal or abnormal process, or of a condition or disease. For example, a glycoprotein CA-152 is a biomarker that signals the existence of a cancer. Hence, biomarkers are often measured and evaluated to identify the presence or progress of a particular disease or to see how well the body responds to a treatment for a disease or condition. Existence or a change in quantity level of biomarkers in proteins, peptides, lipids, glycan or metabolites can be measured by mass spectrometers.

Among numerous types of mass spectrometers, Matrix-Assisted Laser Desorption/Ionization Time-of-Flight Mass Spectrometry (MALDI-TOF MS) is an analytical tool employing a soft ionization technique. Samples are embedded in a matrix and a laser pulse is fired at the mixture. The matrix absorbs the laser energy and the molecules of the mixture are ionized. The ionized molecules are then accelerated through a part of a vacuum tube by an electrical field and then fly in the rest of the chamber without fields. Time-of-flight is measured to produce the mass-to-charge ratio (m/z). MALDI-TOF MS offers rapid identification of biomolecules such as peptides, proteins and large organic molecules with very high accuracy and subpicomole sensitivity. MALDI-TOF MS may be used in a laboratory environment to rapidly and accurately analyze biomolecules and expanding its application to clinical areas such as microorganism detection and disease diagnosis such as cancers.

Disease diagnosis using MALDI-TOF MS in a clinical environment, however, presents several problems. One problem is poor reproducibility of the mass analysis data. In particular, sample preparation process is a major factor affecting data reproducibility of MALDI-TOF MS, where a specific target material is extracted from an original sample, mixed with a matrix and then loaded onto a sample plate. Handling processes may inevitable involve human intervention where a person manually moves samples from one processing step to another processing step and/or performs a number of experimental processes. This makes the data susceptible to uncontrolled external influences, which leads to poor homogeneity or separability of a sample and a risk of sample contamination.

Another factor affecting data reproducibility is the measurement sensitivity or measuring process of the MALDI-TOF MS system itself. While MALDI-TOF MS can analyze samples fast with high sensitivity so that it would be an excellent tool for clinical application, it may be a relatively poor quantitative analyzer because Relative Standard Deviation (RSD) of detected signal intensities is relatively high due to its nature of ionization process using organic matrix. Even though the MALDI-TOF MS system adopts a delayed extraction technique, it may be challenging to have all the particles of a mass get the same kinetic energy just before entering a field-free zone in the chamber. It may be an inevitable data spread source.

Other techniques may account for the inherent inconsistency of sample distribution on the plates that the machine ionizes.

Even with an integrated sample preparation system, the sample may be inconsistently applied across the test plate upon which the MS laser is irradiated. A method to deal with this is to add up all the data from well-to-well (or locus-to-locus) in a spot of the test plate and/or average them to yield the representative data. This method may be insufficient, because each well also has its sample irregularly spread across its surface. Embodiments overcome this inconsistency by considering each locus separately. Embodiments relate to a MALDI-TOF MS data generation unit to increase data reproducibility. Some MALDI-TOF MS devices use a sum or an average value of the data spotting on a specific sample spot of a plate. Embodiments include a calibration unit to correct the spotting data using a statistical method to increase the reproducibility of the data. For example, the data on a spot may not be uniform. The uniformity might be higher in a liquid form of the sample. However, a sample may be prepared in a solid form on a sample plate, then converted to a gaseous state to be analyzed intrinsically may cause relatively lower uniformity, which in turn may degrade reproducibility of the mass data. Therefore, the data acquired during laser spotting on the same spot should be carefully examined and calibrated for high reproducibility. Embodiments store data for each laser irradiation in a MALDI-TOF MS and calibrate intensities by eliminating the outliers of the intensity data for each mass-to-charge (m/z) peak or selecting a data set which shows the lowest RSD or utilizing the sufficient information from shot-to-shot data (e.g. converting to a reasonably continuous data distribution). Elimination may be done with an algorithm by which some percentages of the data shall be eliminated before averaging or summation of the intensities, in accordance with embodiments. The percentage of elimination may be determined by at least one predefined rule to minimize the RSD of the intensities.

Each time a laser pulse is fired on a spot, a spectrum of peaks may be created. Due to non-homogenous nature of drying sample and matrix mixture on a sample plate, intensities may vary depending on a spot hit by a laser beam. Measured mass values and corresponding intensities may vary with shots. In accordance with embodiments, a disease diagnostics software or microorganism identification software include aspects of the following algorithm: The mass values by a single pulse of laser are stored on a data storage space in MALDI-TOF MS system without adding to or averaging with the data obtained from other laser irradiations. AND/OR The stored mass and intensity data may then be analyzed and/or filtered out depending upon the characteristics of the analysis of diseases. AND/OR The stored mass value may have a spread distribution for each mass, so that the authentic mass value for each mass in a spot of a sample plate may be estimated for the analysis of disease identification or microbial tests. AND/OR Since every laser shot yields a slightly different authentic mass value, each authentic mass may be adjusted to the corresponding standard mass value for diagnostic purposes. AND/OR The measured intensity values are then normalized and calibrated for each standard authentic mass. The stored intensity data for each laser shot may then be put together into its distribution curve for filtering out to reduce the RSD of the data. Embodiments relate to finding authentic mass and/or center of mass in a single laser shot. All the particles of the same mass may drift into the field-free chamber of MALDI-TOF MS with the same velocity, but in some circumstances may deviate from the velocity of the authentic mass. The mass data obtained from a detector may be calibrated for diagnostic and/or other applications to obtain standard mass by authentic mass and/or center of mass information based on certain observations, in accordance with embodiments.

In embodiments, observations may relate to a deviation from the authentic mass due to inherent nature of ions that can be denoted as $I(j)*(m(i,j)-m(i,c))$, where $m(i,j)$ is a measured mass (converted from time) with an intensity $I(j)$ and $m(i,c)$ is the authentic mass or the center of mass related to all $I(j)$. Since the intensity $I_j$ $(=I(j))$ may be related to the number of particles of the mass, $m_i$ $(=m(i,j))$, the quantity $m_i*I_j$ may be closer to the quantity of the specific mass $m_i$, rather than $m_i$ itself or $I_j$ alone. The weighted average of the quantity $m_i*I_j$ can be written as $\Sigma(m_i*I_j)/\Sigma I_j$ and may be treated as a kind of the center of mass, $m_c$, which may be equivalent to $\Sigma I_j*(m_i-m_c)=0$, meaning that the ion particles are distributed and equilibrated around the center of mass. Therefore, in embodiments, the authentic mass or the center of mass, $m_c$, can be estimated using the intensity weighted mass formula as the definition above. In other words, $m_c$, may be a weighted sum of all the masses around a specific (m/z) of interest. The number of intensities for a mass/charge is selected based on the accuracy of a MALDI-TOF MS, in accordance with embodiments describing dimensional effect and optimal spacing using deep learning technique and/or other techniques.

Embodiments relate to calibration of masses and intensities within a single MALDI plate spot. Matrix solution mixed with a sample may be spotted on a MALDI plate, typically made of metal. A MALDI plate may include multiple spots containing matrix solution mixed with a sample. Laser pulses may be fired multiple times at each spot. Because the solution densities may not be uniform even within a spot and the part of the sample and matrix mixture after a laser irradiation may have a different structure from the one just before the previous laser irradiation, intensity variations for each laser irradiation may be natural and/or inevitable. Such intensity deviations within a spot of a MALDI-plate may be calibrated by a filtering algorithm for each m/z's intensity distribution from the storing data of each laser irradiation.

Each time a laser pulse is fired on a spot of a MALDI plate, a spectrum of peaks may be created, in accordance with embodiments. For each peak of the spectrum, there may be a list of peaks acquired from each laser pulse irradiation. For example, if the irradiation is 1,000 times, the number of laser pulse samples for a mass-to-charge-ratio (m/z) peak may be 1,000 under theoretically ideal circumstances.

In embodiments, the intensity weighted masses for each mass may be calibrated to a standard mass for diagnostic purposes such as micro-organisms detection and/or cancer marker identification. A standard mass may be a mass representing a mass bracket or mass range, where a mass bracket is a range of masses in which all the masses are the identical mass called standard mass for the bracket.

A standardized mass-to-charge ratio (m/z) library may be created, in accordance with embodiments. The range of a first mass bracket may be the measuring time interval (e.g. time bin of the detection system of MALDI-TOF MS). Since the ions with the same mass may have different initial velocity or velocity distribution at the entrance the field-free chamber of MALDI-TOF MS and enter the chamber entrance slit at different times, some of the mass brackets may need to be merged as an identical entity (e.g. those brackets may be assumed to be an identical mass bracket).

The merge guideline for a second mass bracket may be based on average mass accuracy (e.g. 100 ppm of a mass or $SQRT(1+\beta*(D/L)^2)$) dimensional constant described above. In the ppm example, any mass within 100 ppm of a specific mass may be regarded as the same mass of that specific mass. Another merge guideline example for a second mass bracket is to use a modified uniform interval for the first range and then employ a concept of difference comparison in which a mass of a bracket and another mass of the adjacent bracket are compared and merged if the difference of two masses is within the modified uniform bracket interval. For example, a table may be generated containing brackets with base (m/z) ranging from 0 to 50,000 (or any relatively high number), each bracket having a range of (m/z)'s with an interval of 0.001 or other number (modified uniform interval), where machine accuracy error (in this example) is assumed to be greater than 1 ppm for 1,000 so that 0.001 covers most of all machine errors in presence. If the minimum intensity of a bracket minus the maximum intensity of the bracket prior to the bracket of interest is less than the pre-set machine accuracy error (e.g. 0.001 or second decimal points, 0.01), then those brackets are merged into one, labeled with a median value of the merged ranges.

If there are two or more known (m/z)'s in any bracket range, such bracket may be split into two or more subbrackets. For example, if an example median contains two or more known (m/z)'s in nature, then the bracket represented by that median split into two or more sub-brackets.

Embodiments relate to calibration of intensities within a single MALDI plate spot. Any m/z may be adjusted to the standardized m/z, in accordance with embodiments. After all the acquired intensities are rearranged for the standard m/z, each standard m/z may have its own m/z range and corresponding intensity obtained from each laser pulse irradiation. Each standard m/z may have an intensity distribution containing outliers of an abnormal character. For example, a parameter table of 1,000 laser irradiation may be constructed. In embodiments, a rounded intensity value may be rounded down to two decimal places, if the machine error is 10 ppm for 1,000 Dalton of mass.

Several filtering guidelines may be employed to minimize the RSD, in accordance with embodiments. For example, 90% of the high intensities may be selected to be the intensities of (m/z) if its average RSD is the minimum at the selection level. Abundance (frequency of a range) or intensity level may be one of the candidates for a filtering guideline, in accordance with embodiments.

Embodiments relate to calibration of intensities to reduce spot-to-spot variation. The intensities of a mass spectrum may vary from one spot to another within a plate. Spot-to-spot variation may be reduced by scaling or normalizing the intensities according to a scale factor or a normalization factor that results in the minimum average RSD. Average RSD may also be different depending on a method of selecting peaks. Thus, according to embodiments, an average RSD for each scale/normalization factor and each method of selecting peaks may be obtained, and then the scale/normalization factor and the method that can minimize the average RSD is selected.

Higher accuracy in MALDI-TOF MS data may be achieved by implementing an algorithm which finds standard masses and highly reproducible intensity data. Reproducibility may be measured by the Relative Standard Deviation (RSD) of a measurement data set. RSD is the standard deviation of intensity divided by the average intensity of a MALDI-TOF mass spectrum peak. Embodiments may reduce the RSD by minimizing errors in sample preparation step through automatic processing flow and optimizing acquired measurement data through filtering data obtained from laser irradiations on a spot.

For example, protocols involving the ovarian cancer classification, may have an improved RSD (from 25% to 10%) by automating sample preparation, in accordance with embodiments.

Automation of sample preparation for MALDI-TOF MS analysis may be significant in diagnosis of early-stage disease, such as cancer. In embodiments, benign ovarian tumors and borderline ovarian tumors of ovarian cancer may be successfully classified when the technique of semi-automated sample preparation is applied. Enhancement of reproducibility may be achieved by using a matrix-prespotted MALDI plate and an automation process, in accordance with embodiments, compared to other methods in which a matrix was mixed with serum glycan analytes and manually loaded onto MALDI target plate. In embodiments, automated sample preparation may be able to lower the RSD of MALDI-TOF MS data by at least approximately 10%. Consequently, screening accuracy of benign tumors and borderline tumors may be above approximately 75%, which implies that the classification accuracy between an early stage cancer patient and a person without ovarian cancer may be greater than 75%, in accordance with embodiments.

Embodiments relate to a MALDI-TOF MS data generation unit to increase data reproducibility. Some MALDI-TOF MS devices use a sum or an average value of the data spotting on a specific sample spot of a plate. Embodiments include a calibration unit to correct the spotting data using a statistical method to increase the reproducibility of the data. For example, the data on a spot may not be uniform. The uniformity might be higher in a liquid form of the sample. However, a sample is prepared in a solid form on a sample plate, then converted to a gaseous state to be analyzed intrinsically may cause relatively lower uniformity, which in turn may degrade reproducibility of the mass data. Therefore, the data acquired during laser spotting on the same spot should be carefully examined and calibrated for high reproducibility.

Embodiments store data for each laser irradiation in a MALDI-TOF MS and calibrate intensities by eliminating the outliers of the intensity data for each mass-to-charge (m/z) peak or selecting a data set which shows the lowest RSD. Elimination may be done with an algorithm by which some percentages of the data shall be eliminated before averaging or summation of the intensities, in accordance with embodiments. The percentage of elimination may be determined by at least one predefined rule to minimize the RSD of the intensities.

In accordance with embodiments, a disease diagnostics software or microorganism identification software include aspects of the following algorithm: The mass values by a single pulse of laser are stored on a data storage space in MALDI-TOF MS system without adding to or averaging with the data obtained from other laser irradiations. AND/OR The stored mass and intensity data may then be analyzed and/or filtered out depending upon the characteristics of the analysis of diseases. AND/OR The stored mass value may have a spread distribution for each mass so that the authentic mass value for each mass in a spot of a sample plate may be estimated for the analysis of disease identification or microbial tests. AND/OR Since every laser shot yields a slightly different authentic mass value, each authentic mass may be adjusted to the corresponding standard mass value for diagnostic purposes. AND/OR The measured intensity values are then normalized and calibrated for each standard authentic mass. The stored intensity data for each laser shot may then be put together into its distribution curve for filtering out to reduce the RSD of the data.

Embodiments relate to finding authentic mass and/or center of mass in a single laser shot. All the particles of the same mass may drift into the field-free chamber of MALDI-TOF MS with the same velocity, but in some circumstances may deviate from the velocity of the authentic mass. The mass data obtained from a detector may be calibrated for diagnostic and/or other applications to obtain standard mass by authentic mass and/or center of mass information based on certain observations, in accordance with embodiments.

In embodiments, observations may relate to a deviation from the authentic mass due to inherent nature of ions that can be denoted as $I_i*(m_i-m_c)$, where $m_i$ is a measured mass with an intensity $I_i$, and $m_c$ is the authentic mass or the center of mass. Since the intensity $I_i$ is related to the number of particles of the mass, $m_i$, the quantity $I_i*m_i$ may be closer to the quantity of the specific mass $m_i$, rather than $m_i$ itself or $I_i$ itself. The sum of the quantity $\Sigma I_i*m_i$ can be defined as $m_c I_c$ where $I_c$ is $\Sigma I_i$ and $m_c=\Sigma I_i*m_i/\Sigma I_i$. This may be equivalent to $\Sigma I_i*(m_i-m_c)=0$, meaning that the ion particles are distributed and equilibrated around the center of mass. Therefore, in embodiments, the authentic mass or the center of mass, $m_c$, can be estimated using the intensity weighted mass formula, $m_c=\Sigma Ii*m_i/\Sigma I_i$ as the definition above. In other words, $m_c$ may be a weighted sum of all the masses around a specific (m/z) of interest. The number of intensities for a mass/charge is selected based on the accuracy of a MALDI-TOF MS, in accordance with embodiments.

Embodiments relate to calibration of (m/z)'s and intensities within a single MALDI plate spot. Matrix solution mixed with a sample may be spotted on a MALDI plate, typically made of metal. A MALDI plate may include multiple spots containing matrix solution mixed with a sample. Laser pulses may be fired multiple times at each spot. Because the solution densities may not be uniform even within a spot and the part of the sample and matrix mixture after a laser irradiation may have a different structure from the one just before the previous laser irradiation, intensity variations for each laser irradiation may be natural and/or inevitable. Such intensity deviations within a spot of a MALDI-plate may be calibrated by a filtering algorithm for each m/z's intensity distribution from the storing data of each laser irradiation.

Each time a laser pulse is fired on a spot of a MALDI plate, a spectrum of peaks may be created, in accordance with embodiments. For each peak of the spectrum, there may be a list of peaks acquired from each laser pulse irradiation. For example, if the irradiation is 1,000 times, the number of peaks for a mass-to-charge (m/z) shall be 1,000 if all the peaks are above noise threshold level. Those (m/z)'s of relatively slight differences may be calibrated to the corresponding standard mass/charge (m/z).

In embodiments, the intensity weighted masses for each mass may be calibrated to a standard mass for diagnostic purposes such as micro-organisms detection and/or cancer marker identification. A standard mass may be a mass representing a mass bracket, where a mass bracket is a range of masses in which all the masses are the identical mass called standard mass for the bracket.

A standardized mass-to-charge ratio (m/z) library may be created, in accordance with embodiments. The range of a first mass bracket may be the measuring time interval (e.g. time bin of the detection system of MALDI-TOF MS). Since the ions with the same mass may have different initial velocity at the entrance the field-free chamber of MALDI-TOF MS, some of the mass brackets may need to be merged as an identical entity (e.g. those brackets may be assumed to be an identical mass bracket). The merge guideline for a second mass bracket may be based on average mass accuracy (e.g. 100 ppm of a mass). In this example, any mass within 100 ppm of a specific mass may be regarded as the same mass of that specific mass.

Another merge guideline example for a second mass bracket is to use a modified uniform interval for the first range and then employ a concept of difference comparison in which a mass of a bracket and another mass of the adjacent bracket are compared and merged if the difference of two masses is within the modified uniform bucket interval. For example, a table may be generated containing brackets with base (m/z) ranging from 0 to 50,000 (or any relatively high number), each bracket having a range of (m/z)'s with an interval of 0.001 (modified uniform interval), where machine accuracy error (in this example) is assumed to be greater than 1 ppm for 1,000 so that 0.001 covers most of all machine errors in presence. If the minimum intensity of a bracket minus the maximum intensity of the bracket prior to the bracket of interest is less than the pre-set machine accuracy error (e.g. 0.001 or second decimal points, 0.01), then those brackets are merged into one, labeled with a median value of the merged ranges.

If there are two or more known (m/z)'s in any bracket range, such bracket may be split into two or more sub-brackets. For example, if an example median contains two or more known (m/z)'s in nature, then the bracket represented by that median split into two or more sub-brackets.

Embodiments relate to calibration of intensities within a single MALDI plate spot. Any m/z may be adjusted to the standardized m/z, in accordance with embodiments. After all the acquired intensities are rearranged for the standard m/z, each standard m/z may have its own m/z range and corresponding intensity obtained from each laser pulse irradiation. Each standard m/z may have an intensity distribution containing outliers of an abnormal character. For example, a parameter table of 1,000 laser irradiation can be constructed. In embodiments, a rounded intensity value may be rounded down to two decimal places, if the machine error is 10 ppm for 1,000 of m/z.

Several filtering guidelines may be employed to minimize the RSD, in accordance with embodiments. For example, 90% of the high intensities may be selected to be the intensities of (m/z) if its average RSD is the minimum. Abundance (frequency of a range) or intensity level may be one of the candidates for a filtering guideline, in accordance with embodiments.

Embodiments relate to calibration of intensities to reduce spot-to-spot variation. The intensities of a mass spectrum may vary from one spot to another within a plate. Spot-to-spot variation may be reduced by scaling or normalizing the intensities according to a scale factor or a normalization factor that results in the minimum average RSD. Average RSD may also be different depending on a method of selecting peaks. Thus, according to embodiments, an average RSD for each scale/normalization factor and each method of selecting peaks may be obtained, and then the scale/normalization factor and the method that can minimize the average RSD is selected.

In embodiments, with an automated procedure of sample preparation and/or calibration methods, there may be significant enhance the reproducibility of the MALDI-TOF MS for a diagnostic purpose, such a cancer diagnosis.

It will be obvious and apparent to those skilled in the art that various modifications and variations can be made in the embodiments disclosed. This, it is intended that the disclosed embodiments cover the obvious and apparent modifications and variations, provided that they are within the scope of the appended claims and their equivalents.

What is claimed is:

1. An apparatus comprising:
   a laser configured to irradiate a plurality of laser pulses on a target area to ionize a sample placed in the target area into at least one ionized particle;
   at least one electrode at a first end of a flight tube configured to accelerate the at least one ionized particle into the flight tube;
   a detector at a second opposite end of the flight tube which independently measures a time of flight of the at least one ionized particle through the flight tube and an intensity of the at least one ionized particle for each pulse of the plurality of laser pulses, wherein:
      the independently measures comprises the detector outputting data which represents independent measurements, and
      said independently measures comprises measuring a distribution of the time of flight and intensity of the at least one ionized particle; and
   at least one processor that compares the independent measurements to a reference library of mass spectrometer reference data.

2. The apparatus of claim 1, wherein said independently measures comprises using a noise filter from noise produced in the target area as a result of the target area being irradiated by a plurality of laser pulses.

3. The apparatus of claim 2, wherein the noise filter minimizes data truncation of data measured by the detector.

4. The apparatus of claim 2, wherein the noise filter minimizes intensity effects of data measured by the detector.

5. The apparatus of claim 1, wherein the detector independently measures to isolate variations in attributes of each of the ionized particles.

6. The apparatus of claim 5, wherein the attributes of each of the ionized particles comprises an acceleration efficiency of each of the ionized particles through the at least one electrode.

7. The apparatus of claim 5, which the attributes of each of the ionized particles comprises delays in at least one of the plurality of ionized particles entering the flight tube.

8. The apparatus of claim 5, wherein the attributes of each of the ionized particles comprises variations of path of flight of at least one of the plurality of ionized particles inside the flight tube.

9. The apparatus of claim 1, wherein the detector independently measures to compensate for physical variations in the sample.

10. The apparatus of claim 1, wherein the detector independently measures to optimize data reproducibility.

11. The apparatus of claim 1, wherein the detector independently measures to maximize diagnostic accuracy.

12. The apparatus of claim 1, wherein the independently measures comprises independently measuring the time of flight and the intensity of the at least one ionized particle for each locus of the sample.

13. The apparatus of claim 12, wherein:
   the target area comprises at least one well; and
   said independently measures comprises independently measuring the time of flight and the intensity of the at least one ionized particle for each of the at least one well.

14. The apparatus of claim 1, wherein the sample reference library is stored in at least one of a storage device, a Matrix-Assisted Laser Desorption/Ionization Time-of-Flight Mass Spectrometer (MALDI-TOF MS), a data storage device in the apparatus, a data storage device outside the apparatus, a data storage device in communication with the apparatus through a network, a cloud storage system, or a data storage device in communication with the apparatus through an internet connection.

15. The apparatus of claim 1, wherein the at least one processor receives the data output from the detector is at least one of manipulated or analyzed by the at least one processor prior to being compared to the reference library by the at least one processor.

16. The apparatus of claim 15, wherein the at least one of manipulated or analyzed comprises implementation of at least one of artificial intelligence or a deep learning algorithm.

17. The apparatus of claim 15, wherein the at least one of manipulated or analyzed data by the at least one processor comprises calibrated data produced by statistically analyzing the data output from the detector by the at least one processor.

18. The apparatus of claim 17, comprising a calibration unit configured to statistically calibrate the data output from the detector to maximize the reproducibility of the data.

19. The apparatus of claim 18, wherein the calibrating unit is configured to calibrate intensities of the data output from the detector by eliminating outliers of the intensity data for each mass-to-charge (m/z) peak associated with the at least one ionized particle.

20. The apparatus of claim 18, wherein the calibrating unit is configured to select at least one data set comprising the data output from the detector which shows a relative standard deviation (RSD) satisfying a triggering threshold.

21. The apparatus of claim 20, wherein the triggering threshold is at least one of:
 a predetermined threshold;
 a dynamic threshold;
 a statistically determined threshold;
 a real-time varying threshold;
 a threshold determined by artificial intelligence; or
 a threshold determined by a deep learning algorithm.

22. The apparatus of claim 19, wherein the calibrating unit is configured to select at least one data set comprising the data output from the detector utilizing continuous data distribution analysis after the plurality of laser pulses.

23. The apparatus of claim 22, wherein the select at least one data set comprises using an algorithm by which a percentage of the data is eliminated.

24. The apparatus of claim 23, wherein the algorithm is performed before combining a plurality of data sets of the at least one data set.

25. The apparatus of claim 24, wherein the combining comprises at least one of averaging or summing of the intensities of the plurality of data sets.

26. The apparatus of claim 23, wherein the percentage is determined by at least one predefined rule to minimize a relative standard deviation (RSD) of intensities of the data.

27. The apparatus of claim 1, wherein:
 the sample comprises molecules; and
 characteristic information of the source comprises a biological analysis information of the source.

28. The apparatus of claim 27, wherein the biological analysis information is a medical diagnosis of at least one of a human being, an animal, a plant, or a living organism.

29. The apparatus of claim 1, wherein the apparatus is a Matrix-Assisted Laser Desorption/Ionization Time-of-Flight Mass Spectrometer (MALDI-TOF MS).

30. The apparatus of claim 1, wherein the apparatus is configured to determine from a single laser pulse of the plurality of laser pulses at least one of an authentic mass of the at least one ionized particle or center of mass of the at least one ionized particle.

31. A method of identifying a biomaterial using a Matrix-Assisted Laser Desorption Ionization Time-of-Flight Mass Spectrometry (MALDI-TOF MS), wherein the method comprising:
 irradiating a plurality of laser pulses on a target area to ionize a sample placed in the target area into at least one ionized particle;
 accelerating the at least one ionized particle into a first end of a flight tube; and
 independently detecting at a second opposite end of the flight tube a time of flight of the at least one ionized particle through the flight tube and an intensity of the at least one ionized particle, wherein:
 the independently detecting outputs data which represents independent measurements,
 the independently detecting comprising measuring a distribution of time of flight and intensity of the at least one ionized particle, and
 the independent measurements are compared to a reference library of mass spectrometer reference data.

32. A computer program product, comprising a computer readable hardware storage device having computer readable program code stored therein, said program code containing instructions executable by one or more processors of a computer system to implement a method of assessing damage to an object, said method comprising:
 irradiating a plurality of laser pulses on a target area to ionize a sample placed in the target area into at least one ionized particle;
 accelerating the at least one ionized particle into a first end of a flight tube; and
 independently detecting at a second opposite end of the flight tube a time of flight of the at least one ionized particle through the flight tube and intensity of the at least one ionized particle for each pulse of the plurality of laser pulses, wherein:
 the independently detecting comprises outputting data which represents independent measurements,
 the independently detecting comprises measuring a distribution of time of flight and intensity of the at least one ionized particle, and
 the independent measurements are compared to a reference library of mass spectrometer reference data.

* * * * *